(12) United States Patent
Liu et al.

(10) Patent No.: US 9,982,142 B2
(45) Date of Patent: May 29, 2018

(54) ZINC-RICH EPOXY ANTI-CORROSION COATING AND PREPARATION METHOD THEREOF

(71) Applicant: THE SIXTH ELEMENT (CHANGZHOU) METERIALS TECHNOLOGY CO., LTD., Changzhou, Jiangsu (CN)

(72) Inventors: Qiongxin Liu, Jiangsu (CN); Xiaolan Qu, Jiangsu (CN); Hongtao Xu, Jiangsu (CN); Yan Qu, Jiangsu (CN); Yufei Ma, Jiangsu (CN); Huailiang Xu, Jiangsu (CN); Zhenyu Tian, Jiangsu (CN)

(73) Assignee: THE SIXTH ELEMENT (CHANGZHOU) METERIALS TECHNOLOGY CO., LTD., Changzhou, Jiangsu (CN)

( * ) Notice: Subject to any disclaimer, the term of this patent is extended or adjusted under 35 U.S.C. 154(b) by 203 days.

(21) Appl. No.: 14/888,044

(22) PCT Filed: May 5, 2014

(86) PCT No.: PCT/CN2014/076820
§ 371 (c)(1),
(2) Date: Oct. 29, 2015

(87) PCT Pub. No.: WO2014/169866
PCT Pub. Date: Oct. 23, 2014

(65) Prior Publication Data
US 2016/0280931 A1    Sep. 29, 2016

(30) Foreign Application Priority Data
Mar. 6, 2013 (CN) .......................... 2013 1 0069144

(51) Int. Cl.
C09D 5/10 (2006.01)
C09D 7/12 (2006.01)
C09D 163/00 (2006.01)

(52) U.S. Cl.
CPC .............. C09D 5/106 (2013.01); C09D 5/10 (2013.01); C09D 7/12 (2013.01); C09D 163/00 (2013.01)

(58) Field of Classification Search
CPC ...................................................... C09D 5/106
See application file for complete search history.

(56) References Cited

FOREIGN PATENT DOCUMENTS

| CN | 101407690 A | 4/2009 |
|---|---|---|
| CN | 102254584 A | 11/2011 |
| CN | 102417784 A | 4/2012 |
| CN | 102604533 A | 7/2012 |
| CN | 102816495 A | 12/2012 |
| WO | 96/29372 A1 | 9/1996 |
| WO | 2010/062002 A1 | 6/2010 |
| WO | 2013/191809 A1 | 12/2013 |

OTHER PUBLICATIONS

Wang, Yaowen, 'The Synthesis and Application of Polyaniline and Graphene Nanosheets in Anti-corrosion Coatings', Engineering Master's Dissertation, Dec. 18, 2012 (English abstract at p. 6 submitted herewith).
Dhiraj Prasai et al., 'Graphene: Corrosion-Inhibiting Coating', ACS NANO, vol. 6, No. 2, 2012, pp. 1102-1108 (published online Feb. 2, 2012).

*Primary Examiner* — Peter F Godenschwager
(74) *Attorney, Agent, or Firm* — Novick, Kim & Lee, PLLC; Allen Xue

(57) ABSTRACT

This invention relates to a zinc-rich epoxy anti-corrosion coating comprising a component A capable of being cured into a film, and a component B containing a curing agent, wherein the component A comprises, by mass percentage, 0.1-5 wt % graphene, 0-35 wt % zinc powder, 30-70 wt % filler, 10-20 wt % epoxy resin having 54 wt % solid content, and 10-20 wt % solvent, wherein the sum of the mass percentage contents of the graphene, zinc powder and filler is 60-80 wt % and the sum of the mass percentage contents of all components of component A is 100 wt %. According to the present invention, the addition of graphene to an anti-corrosion coating decreases the thickness of the coating film, reduces the amount of zinc powder while increases the anti-corrosion effect. It reduces zinc oxide vapour generated during welding and is environmentally friendly.

15 Claims, No Drawings

ZINC-RICH EPOXY ANTI-CORROSION COATING AND PREPARATION METHOD THEREOF

TECHNICAL FIELD

This invention relates to an anti-corrosion coating and the preparation method thereof. In particular, this invention relates to an epoxy resin-based and graphene-containing zinc-rich epoxy anti-corrosion coating and preparation method thereof.

BACKGROUND

Corrosion is a phenomenon that objects such as metals, concretes and woods suffer from chemical actions or electrochemical actions of the ambient environmental medium. According to relevant statistics, the economic losses due to corrosion around the world are 700 billion to 1 trillion dollars. It is about six times more than the sum total of economic losses due to natural hazards such as earthquake, flood, and typhoon etc. The economic losses due to corrosion in China are 800 billion, accounting for around 3% of GDP. In order to slow down the corrosion rate, many techniques have been developed.

Nowadays, there are several fundamental anti-corrosion coatings mainly including epoxy, polyurethane and zinc-rich primer coatings. Among those, the epoxy anti-corrosion coatings have excellent adhesion, superior mechanical property, good alkali resistance and chemical medium corrosion resistance, and high content of solid component. However, the coating films formed from the epoxy anti-corrosion coatings exhibit high hardness and poor flexibility at the early stage. The bituminous and chromate epoxy anti-corrosion coatings are greatly destructive to environment and harmful to human health. Polyurethane coatings have advantages such as strong adhesion, water resistance, oil resistance, solvent resistance, corrosion resistance, good elasticity, high strength, and low temperature resistance, and the formed coating films is bright, stiff, flexible, thick, wear-resistant and scratch-resistant. However, they have poor gloss and colour retention, strong irritation and toxicity, poor stability and inconvenient use. The zinc-rich primer coatings have shielding effect, electrochemical protection effect, self-healing of coating film, and inactivation effect. However, they achieve anti-corrosion features at the expense of sacrificing zinc powder, and they generate a large amount of zinc oxide vapour during welding, thereby harming life health of occupational workers.

Chinese patent publication No. CN101407690A discloses a two-component epoxy zinc-rich primer and the preparation method thereof. Component A consists of, by weight parts, 14 parts of epoxy resin, 54-71 parts of zinc powder, 4-20 parts of filler, 1-3 parts of anti-settling agent, and 9 parts of solvent. Component B comprises, by mass percentage contents, 40% of curing agent and 60% of solvent. The mass ratio of component A to component B is 8:1-15:1. The coating according to this invention has only 3 days, i.e. 72 hours of the time of salt fog resistance, and it requires 54-71 parts of zinc powder.

In current industrial standard HG/T3668-2009, the time of salt fog resistance for organic zinc-rich primer is indicated, i.e. non-volatile components (%) are ≥70. The time of salt fog resistance is required for 600 h if the contents of metal zinc in the non-volatile components (%) are ≥80; and the time of salt fog resistance is required for 200 h if the contents of metal zinc in the non-volatile components (%) are ≥60.

Corrosion will occur when the surface of metals is contacted with air, water or other substances. The fundamental method for preventing corrosion is to coat metals with coating materials to shield the surface of metals. However, the currently used coating materials have their own limitations.

Graphene is a new carbonaceous material, in which the carbon atoms closely packed in a monolayer, and have a dimensional sheet-like structure. It has excellent electrical properties and large diameter-to-thickness ratio (>200) as well as thin sheet-like structure (<1 nm). It is known as the thinnest and strongest material. The arrangement of carbon atoms in graphene is just like a network of chicken paw prints. Each layer is very thin and transparent. 28 football pitches can be covered by using one ounce of it (Graphene: Corrosion-Inhibiting Coating, Dhiraj Prasai et al., ACS NANO, Vol. 6, No. 2, 2012: pp. 1102-1108). Dhiraj Prasai et al. indicated that the corrosion of underneath metal could be inhibited by utilizing graphene having atomic lamina as protective coating. However, the graphene in this report is grown through chemical vapour deposition. Therefore, this method only remains in the phase of theoretical research. In addition, this method is enormously expensive, and difficult in manufacturing.

Chinese patent publication No. CN102604533A discloses an anti-corrosion coating based on a composite material of polyaniline and graphene, and the preparation method thereof. The anti-corrosion coating consists of, by weight parts, 20-90 parts of film forming substance, 0.1-20 parts of composite material of polyaniline and graphene, 1-10 parts of pigment, 1-10 parts of filler, 0.1-3 parts of anti-sagging agent, 0.1-4 parts of dispersing agent, 0.01-2 parts of leveling agent, 0.01-2 parts of antifoaming agent, and 1-50 parts of solvent. According to this invention, graphene, with high diameter-to-thickness ratio and good flexibility, can provide superior physical anti-corrosion effect, while polyaniline absorbed on the surface of graphene result in electrochemical anti-corrosion effect. The mechanism of synergistic effect of them allows the coating having superior metal corrosion protection performance. The anti-corrosion coating of this invention can achieve the activation and corrosion inhibition of metal substrate while avoid the employment of heavy metals such as chromium that can result in environmental pollution. The coating in this invention is easy to prepare and process, low-cost, and suitable for industrial production. However, during the preparation of the anti-corrosion coating, as claimed in Chinese patent publication No. CN102604533A, the step of adding graphene is complex and require supporting solutions such as an oxidizing agent.

Therefore, it is highly desired to develop an environmentally friendly zinc-rich epoxy anti-corrosion coating, which can generate a relatively thin coating film with good flexibility, high hardness, low zinc content, and long time of salt fog resistance as well as acid and alkali resistance in the art. At the same time, the processing of the epoxy resin coating should be simple.

SUMMARY

In order to overcome the deficiencies in the prior field, it is required to provide a zinc-rich epoxy anti-corrosion coating having a reduced zinc content and satisfactory anti-corrosion property (i.e., time of salt fog resistance). The zinc-rich epoxy anti-corrosion coating should have properties such as acid and alkali resistance, relatively high hardness, relatively good flexibility, relatively thin coating film and being environmentally friendly.

The first object of the invention is to provide an environmentally friendly zinc-rich epoxy anti-corrosion coating, and the formed coating film after applying has relatively thin thickness, relatively good flexibility, and relatively high hardness.

The invention can be achieved by the following technical solutions.

The invention provides a zinc-rich epoxy anti-corrosion coating comprising a component A capable of being cured into a film, and a component B comprising a curing agent, wherein the component A comprises, by mass percentage,

| | |
|---|---|
| graphene | 0.1-5 wt %, |
| zinc powder | 0-35 wt %, |
| filler | 30-70 wt %, |
| epoxy resin having 54 wt % solid content | 10-20 wt %, and |
| solvent | 10-20 wt %; | wherein, the sum of the mass percentage contents of the graphene, zinc powder and filler is 60-80 wt %, such as 61 wt %, 64 wt %, 66 wt %, 68 wt %, 73 wt %, 76 wt %, 77 wt %, and 79 wt % etc, and the sum of the mass percentage contents of all components of component A is 100 wt %.

The invention can provides a novel composite coating having good anti-corrosion effect, long service life, non-toxic, non-pollution, thin coating film and wide application range by utilizing graphene having a large specific surface area, excellent anti-corrosion property, excellent conductivity, and good chemical stability.

According to the present invention, the addition of graphene to an anti-corrosion coating material significantly decreases the thickness of the coating film, and the selection of individual components increases the anti-corrosion effect while greatly reduces the amount of zinc powder in the coating material. It avoids using zinc-rich coating materials which achieves anti-corrosion features at the expense of sacrificing zinc powder, and subsequently reduces zinc oxide vapour generated during welding and behaves environmentally friendly.

The component B according to the invention is selected from combinations of any curing agents capable of curing the epoxy resin in the component A and solvents. Those skilled in the art can select the component B according to the professional knowledge in the art and the practical situations. In a preferred embodiment, the zinc-rich epoxy anti-corrosion coating comprises the component A capable of being cured into a film, and the component B comprising a curing agent, wherein the component A comprises, by mass percentage,

| | |
|---|---|
| graphene | 0.1-5 wt %, |
| zinc powder | 0-35 wt %, |
| filler | 30-70 wt %, |
| epoxy resin having 54 wt % solid content | 14-18 wt %, and |
| solvent | 12-16 wt %; | wherein, the sum of the mass percentage contents of the graphene, zinc powder and filler is 60-80 wt % and the sum of the mass percentage contents of all components of component A is 100 wt %.

In a further preferred embodiment, the zinc-rich epoxy anti-corrosion coating comprises the component A capable of being cured into a film, and the component B comprising a curing agent, wherein the component A comprises, by mass percentage,

| | |
|---|---|
| graphene | 0.1-5 wt %, |
| zinc powder | 0-35 wt %, |
| filler | 30-70 wt %, |
| epoxy resin having 54 wt % solid content | 16 wt %, and |
| solvent | 14 wt %; | wherein, the sum of the mass percentage contents of the graphene, zinc powder and filler is 60-80 wt % and the sum of the mass percentage contents of all components of component A is 100 wt %.

Preferably, the graphene should be obtained through the oxidization of graphite and following exfoliation.

Preferably, the oxidization method is preferably selected from any one of Hummers method, Staudenmaier method or Brodie method.

Brodie method is described as follows. Natural micro-powder graphite is first treated with fuming $HNO_3$ so that the nitrate ions can be inserted between graphite sheets when oxidizing graphite; then $KClO_4$ is added to further oxidize; subsequently, the reactant is added to a large amount of water for further filtering; it is washed with water until the filtrate is close to neutral, and dried to obtain graphite oxide.

Staudemaier method is described as follows. Graphite powder is treated with a mixed acid of concentrated sulphuric acid and fuming nitric acid and oxidized with $KClO_4$.

Hummers method is described as follows. The graphite powder and anhydrous sodium nitrate ($NaNO_3$) are added to concentrated sulphuric acid placed in ice-bath; KMnO4 is added under vigorous stirring; the remaining $KMnO_4$ and $MnO_2$ are reduced with $H_2O_2$ of 3% by volume to change them into colourless and soluble $MnSO_4$; the suspension becomes brilliant yellow by treating with hydrogen peroxide; it is filtered, washed three times and then dewatered under vacuum to obtain graphite oxide. The sheets of thus obtained graphite oxide have wrinkling structures, high oxygen content, sufficient functional groups and good dispersibility in purified water.

Preferably, the exfoliation method is selected from any one of microwave exfoliation, pyrolysis expansion exfoliation or ultrasonic dispersion.

The content of graphene in the zinc-rich epoxy anti-corrosion coating of the invention can be 0.2 wt %, 0.7 wt %, 1.2 wt %, 1.6 wt %, 1.9 wt %, 2.2 wt %, 2.7 wt %, 3.2 wt %, 3.7 wt %, 4.2 wt %, 4.6 wt %, 4.9 wt %, 5.2 wt %, 5.7 wt %, 6.2 wt %, 6.7 wt %, 7.2 wt %, 7.6 wt %, 7.9 wt %, 8.2 wt %, 8.7 wt %, 9.2 wt %, and 9.7 wt % etc. If the content of graphene is too high, it is prone to agglomerate; and if the content of graphene is too low, the content of zinc powder has to be increased in order to achieve the same environmental protection effect, and thus it is not beneficial to environmental protection.

Preferably, the solvent is selected from solvent being capable of dispersing graphene, preferably any one of benzene hydrocarbons, ketones, alcohols, esters solvents or any combinations thereof. The combinations include, for example, the combination of benzene and propylene glycol, combination of toluene and glycerol, combination of xylene and butanone, combination of toluene and isobutanol, combination of xylene and acetone, and combination of toluene and ethyl acetate etc.

The solvent described in the invention is preferably selected from a mixed solvent formulated from xylene and isobutanol in a mass ratio of 1:1 to 4:1, more preferably a mixed solvent formulated from xylene and isobutanol in a mass ratio of 1:3. The aggregation of graphene can be further effectively prevented by using a mixed solvent of xylene and isobutanol in a mass ratio of 1:1 to 4:1, so as to allow graphene to be homogenously dispersed into the zinc-rich epoxy anti-corrosion coating.

When the mixed solvent of xylene and isobutanol is selected as the solvent, the mass ratio of them can be 1.1:1, 1.4:1, 1.8:1, 2.1:1, 2.5:1, 3:1, 3.1:1, 3.4:1, 3.6:1, and 3.9:1 etc.

Preferably, the filler is selected from any one of barium sulphate, ST anti-rust powder, talc, organobentonite, montmorillonite, titanium dioxide or any combinations thereof. The combinations include, for example, the combination of barium sulphate/ST anti-rust powder, combination of talc/titanium dioxide, and combination of talc/organobentonite etc. Preferably, the filler is barium sulphate.

Preferably, the epoxy resin is bisphenol A epoxy resin, preferably bisphenol A epoxy resin SM-601, more preferably bisphenol A epoxy resin SM-601 manufactured by Sanmu Chemical Co., Ltd.

Bisphenol A epoxy resin has very strong adhesion to various materials, in particular metals, very good chemical corrosion resistance, high mechanical strength, good electrical insulating property and good corrosion resistance. It can be cured in a wide range of temperatures, and has low volume shrinkage when curing.

Preferably, the solvent for dispersing the epoxy resin with a solid content of 54 wt % is xylene.

More preferably, the epoxy resin having 54 wt % solid content is a solution of bisphenol A epoxy resin SM-601 having 54 wt % solid content formulated in a solvent of xylene.

Bisphenol A epoxy resin SM-601 manufactured by Jiangsu Sanmu Chemical Co., Ltd is synthesized from epoxy chloropropane and bisphenol A, and is a solid product formed by controlling the conditions in the production process. Those skilled in the art can select suitable dispersing solvents according to the professional knowledge in the art to disperse the solid bisphenol A epoxy resin SM-601 into a liquid. According to the invention, xylene is preferably used to disperse bisphenol A epoxy resin SM-601.

Bisphenol A epoxy resin SM-601 described in the invention is transparent solid in appearance, free of significant mechanical impurities, and has an epoxy value of 0.18-0.22 eq/100 g, inorganic chlorine of ≤300 ppm, easily saponifiable chlorine of ≤0.5%, volatile matter of ≤0.5%, Gardenner gloss of ≤1.5, and softening point of 60-76° C.

Preferably, the component B described in the invention includes curing agent and solvent.

In a preferred embodiment, the curing agent in the component B according to the invention is any one of acrylic resin curing agent or polyamide resin curing agent or any combination thereof. Preferably, the solvent in the component B is selected from a mixed solvent formulated from xylene and isobutanol in a mass ratio of 1:1.

Preferably, the mass ratio of the curing agent and the solvent in the component B is 1:1.

Preferably, the mass ratio of the component A and the component B in the zinc-rich epoxy anti-corrosion coating is 8:1-12:1, preferably 10:1.

In a preferred embodiment, the zinc-rich epoxy anti-corrosion coating according to the invention comprises:

the component A comprising:

| graphene | 0.1-5 wt %, |
|---|---|
| zinc powder | 0-35 wt %, |
| filler | 30-70 wt %, |
| epoxy resin having 54 wt % solid content | 10-20 wt %, and |
| solvent | 10-20 wt %; | wherein, the sum of the mass percentage contents of the graphene, zinc powder and filler is 60-80 wt % and the sum of the mass percentage contents of all components of component A is 100 wt %; and the component B comprising:

| curing agent | 50 wt %; and |
|---|---|
| solvent | 50 wt %, | wherein, the sum of the mass percentage contents of all components of component B is 100 wt %.

The second object of the invention is to provide a preparation method of the zinc-rich epoxy anti-corrosion coating according to the first object of the invention including Step I: formulating a component A of the zinc-rich epoxy anti-corrosion coating, including (1) adding the epoxy resin in a formula ratio of the component A into a stirred vessel, and stirring;

(2) successively adding the solvent, zinc powder, graphene and filler in a formula ratio of the component A, and stirring to uniformly disperse; and (3) adding the mixture obtained in step (2) into a three-roll grinder, and grinding to obtain the component A;

preferably, the rotation speed of stirring in step (1) is 1000-1500 r/min, such as 1050 r/min, 1150 r/min, 1200 r/min, 1250 r/min, 1340 r/min, 1350 r/min, 1400 r/min, and 1450 r/min etc, preferably 1200 r/min;

preferably, the rotation speed of stirring in step (2) is 2000-3000 r/min, such as 2050 r/min, 2150 r/min, 2200 r/min, 2250 r/min, 2340 r/min, 2450 r/min, 2700 r/min, 2850 r/min, and 2950 r/min etc, preferably 2500r/min; and preferably, the particle size after grinding in step (3) is 20-60 μm, such as 26 μm, 34 μm, 45 μm, 52 μm, and 57 μm etc, preferably 40 μm;

Step II: formulating a component B of the zinc-rich epoxy anti-corrosion coating, including (4) successively mixing the curing agent and solvent in a formula ratio of the component B to obtain the component B; and Step III: mixing the prepared component A and component B based on the formula ratio before use, to obtain the zinc-rich epoxy anti-corrosion coating.

Compared with the prior art, the invention has the following beneficial effects.

(1) The invention provides a novel composite coating having good anti-corrosion effect, long service life, no toxicity, no pollution, thin coating film and wide application range by utilizing graphene having a large specific surface area, excellent anti-corrosion property, excellent conductivity, and good chemical stability.

(2) According to the present invention, the addition of graphene to an anti-corrosion coating significantly decreases the thickness of the coating film, and the selection of individual components increases the anti-corrosion effect while greatly reduces the amount of zinc powder (the amount of zinc powder is far lower than that required by the existing standard of HG/T3668-2009). It avoids using zinc-rich coatings which achieves anti-corrosion features at the expense of sacrificing zinc powder, and substantially reduces zinc oxide vapour generated during welding and behaves environmentally friendly.

(3) The zinc-rich epoxy anti-corrosion coating according to the invention not only has relatively long time of salt fog resistance (up to 1000 h), but also has excellent acid and alkali resistance. The phenomenon of bubbling, cracking, flaking, pulverizing and dissolving out will not occur after immersing the coating film in acid for 7 days and in alkali for 15 days, respectively.

(4) The process for preparing the zinc-rich epoxy anti-corrosion coating according to the invention is simple, and provides a novel concept of applying graphene to the anti-corrosion coating.

DETAILED DESCRIPTION OF THE INVENTION

Some exemplary but non-restrictive examples according to the invention are provided as follows so as to specifically illustrate the invention and to better understand the solutions of the invention.

A preparation method of the zinc-rich epoxy anti-corrosion coating includes

Step I: formulating a component A of the zinc-rich epoxy anti-corrosion coating, including (1) adding the epoxy resin in a formula ratio of the component A into a stirred vessel, and stirring in a rotation speed of 1000-1500 r/min;

(2) successively adding the solvent, zinc powder, graphene and filler in a formula ratio of the component A, and stirring in a rotation speed of 2000-3000 r/min to uniformly disperse; and (3) adding the mixture obtained in step (2) into a three-roll grinder, and grinding to have a particle size of 20-60 μm to obtain the component A;

Step II: formulating a component B of the zinc-rich epoxy anti-corrosion coating, including (4) preparing a mixed solvent of xylene and isobutanol in a mass ratio of 1:1 as the solvent of the component B, successively mixing the curing agent and solvent in a formula ratio of the component B to obtain the component B; and Step III: mixing the prepared component A and component B based on the formula ratio before use to obtain the zinc-rich epoxy anti-corrosion coating.

Each component and mass percent content thereof of the zinc-rich epoxy anti-corrosion coating provided in examples 1-4 are shown in table 1 below.

TABLE 1 components of the zinc-rich epoxy anti-corrosion coating provided in examples 1-4

| Component | Name of raw materials | Examples (wt %) | | | |
|---|---|---|---|---|---|
| | | 1 | 2 | 3 | 4 |
| Component A | Graphene | 2 | 1 | 2 | 2 |
| | Zinc powder | 0 | 35 | 35 | 20 |
| | Barium sulphate | 68 | 34 | 33 | 48 |
| | Epoxy resin | 16 | 16 | 16 | 16 |
| | Solvent 1 | 14 | 14 | 14 | 14 |

TABLE 1-continued components of the zinc-rich epoxy anti-corrosion coating provided in examples 1-4

| Component | Name of raw materials | Examples (wt %) | | | |
|---|---|---|---|---|---|
| | | 1 | 2 | 3 | 4 |
| Component B | Polyamide resin | 50 | 50 | 50 | 50 |
| | Solvent 2 | 50 | 50 | 50 | 50 |

Notes:
the epoxy resin is epoxy resin SM-601 having 54 wt % solid content (the dispersing solvent is xylene);
solvent 1 is a mixed solvent of xylene and isobutanol formulated in a mass ratio of 3:1;
the graphene is obtained by oxidizing graphite with Hummers method and then exfoliating via microwave;
the curing agent is polyamide resin curing agent; and solvent 2 is a mixed solvent of xylene and isobutanol formulated in a mass ratio of 1:1.

The component A and the component B of the zinc-rich epoxy anti-corrosion coating is mixed in a mass ratio of 10:1 before use.

EXAMPLE 5

A zinc-rich epoxy anti-corrosion coating comprises, by mass percentage, a component A:

| graphene | 0.1 wt %; |
|---|---|
| zinc powder | 26 wt %; |
| talc | 13.9 wt %; |
| montmorillonite | 20 wt %; |
| epoxy resin | 20 wt %; and |
| xylene and isobutanol (m:m = 1:1) | 20 wt %; | wherein, the epoxy resin is epoxy resin SM-601 having 54 wt % solid content (the dispersing solvent is xylene); the sum of the mass percentage contents of the graphene, zinc powder and filler is 60 wt %; and the graphene is obtained by oxidizing graphite with Staudenmaier method and then exfoliating via pyrolysis expansion;

a component B:

| polyamide resin curing agent | 40 wt %; and |
|---|---|
| xylene and isobutanol in m:m = 1:1 (constant) | 60 wt %; | wherein, the sum of the mass percentage contents of all components of component B is 100 wt %.

The preparation method of the zinc-rich epoxy anti-corrosion coating includes (1) adding the epoxy resin in a formula ratio of the component A into a stirred vessel, and stirring in a rotation speed of 1500 r/min;

(2) successively adding the solvent, zinc powder, graphene and filler in a formula ratio of the component A, and stirring in a rotation speed of 2000 r/min to uniformly disperse; and (3) adding the mixture obtained in step (2) into a three-roll grinder, and grinding to have a particle size of 20 μm to obtain the component A;

Step II: formulating a component B of the zinc-rich epoxy anti-corrosion coating, including (4) successively mixing the curing agent and solvent in a formula ratio of the component B to obtain the component B; and Step III: mixing the prepared component A and component B in a mass ratio of 8:1 before use to obtain the zinc-rich epoxy anti-corrosion coating.

EXAMPLE 6

A zinc-rich epoxy anti-corrosion coating comprises, by mass percentage, a component A:

| | |
|---|---|
| graphene | 5 wt %; |
| zinc powder | 5 wt %; |
| organobentonite | 70 wt %; |

-continued

| | |
|---|---|
| epoxy resin | 10 wt %; and |
| xylene and isobutanol (m:m = 3:1) | 10 wt %; | wherein, the epoxy resin is epoxy resin SM-601 having 54 wt % solid content (the dispersing solvent is xylene); the sum of the mass percentage contents of the graphene, zinc powder and filler is 80 wt %; and the graphene is obtained by oxidizing graphite with Brodie method and then dispersing via ultrasonication;

a component B:

| | |
|---|---|
| acrylic resin curing agent | 60 wt %; and |
| xylene and isobutanol (m:m = 1:1) | 40 wt %. | wherein, the sum of the mass percentage contents of all components of component B is 100 wt %.

The preparation method of the zinc-rich epoxy anti-corrosion coating includes (1) adding the epoxy resin in a formula ratio of the component A into a stirred vessel, and stirring in a rotation speed of 1000 r/min;

(2) successively adding the solvent, zinc powder, graphene and filler in a formula ratio of the component A, and stirring in a rotation speed of 3000 r/min to uniformly disperse; and (3) adding the mixture obtained in step (2) into a three-roll grinder, and grinding to have a particle size of 60 μm to obtain the component A;

Step II: formulating a component B of the zinc-rich epoxy anti-corrosion coating, including (4) successively mixing the curing agent and solvent in a formula ratio of the component B to obtain the component B; and Step III: mixing the prepared component A and component B in a mass ratio of 12:1 before use to obtain the zinc-rich epoxy anti-corrosion coating Performance Tests The performance tests were performed on the zinc-rich epoxy anti-corrosion coatings prepared in examples 1-6. The test methods and instruments were shown in table 2.

TABLE 2 test methods and instruments used in performance tests

| Items | Test methods | Test instruments |
|---|---|---|
| Appearance and colour | Visually | — |
| Fineness, μm | GB/T1724-79 | Scraper fineness meter (type QXD-100), Tianjin Weida tester Co., Ltd |
| Solid content, % | | GB/T1725-2007 oven drying method |
| Impact strength, kg · cm | GB/T1732-93 | Coating impact instrument, type QCJ, Tianjin Dongwenya material tester Co., Ltd |
| Hardness (H) tested after 7 days | Testing standard: selecting a pencil having a hardness of 2H, applying 1 kgf along a direction of 45° angle, and moving 6-7 mm; criterion: no scratch marks | |
| Adhesion level | GB/T1720-79 circle method | Coating adhesion test instrument, type QFZ, Tianjin Dongwenya material tester Co., Ltd |
| Flexibility (mm) | GB/T1731-79 | Coating flexibility tester, type QTX, Tianjin Dongwenya material tester Co. Ltd; Pull-off tester, type PosiTsetAT, Shanghai Lrel Instrument Equipment Co., Ltd |
| Water resistance | | GB/T1733-93, immersing in water for 7 days |
| Salt water resistance | | GB1763-79, immersing in 3% NaCl solution for 21 days |
| Acid resistance | | GB1763-79, immersing in 5% $H_2SO_4$ solution for 7 days |
| Alkali resistance | | GB1763-79, immersing in 5% NaOH solution for 15 days |
| Salt fog resistance | GB/T1771-2007 | Precision salt fog tester (type HG-60), Suzhou Henggang Electronics Co., Ltd |

The results of performance test for examples 1-6 are shown in table 3.

TABLE 3 the results of performance test for examples 1-6

| | Examples | | | | | |
|---|---|---|---|---|---|---|
| Items | 1 | 2 | 3 | 4 | 5 | 6 |
| Appearance and colour | flat and smooth | | | | | |
| Fineness, μm | 40 | 40 | 40 | 40 | 20 | 60 |
| Solid content, % | 79 | 79 | 79 | 79 | 71 | 81 |
| Impact strength, kg/cm | 40 | 40 | 40 | 40 | 40 | 40 |
| Hardness (H) | 2HB | 2HB | 2HB | 2HB | 2HB | 2HB |
| Adhesion | 2 | 2 | 2 | 2 | 2 | 2 |
| Flexibility (mm) | 5 | 5 | 5 | 5 | 5 | 5 |
| Water resistance | unchanged, no bubble, no wrinkling, no flaking and no rust | | | | | |
| Salt water resistance | no rust, no bubble, no flaking and no cracking | | | | | |
| Acid resistance | no bubble, no cracking, no flaking, no pulverizing and dissolving out | | | | | |
| Alkali resistance | no bubble, no cracking, no flaking, no pulverizing and dissolving out | | | | | |
| Salt fog resistance | 500 h | 850 h | 1000 h | 930 h | 720 h | 800 h |

It can be seen from the results shown in table 2 that the zinc-rich epoxy anti-corrosion coating according to the invention maintains the anti-corrosion effect while greatly reduces the amount of zinc powder. It avoids the environment pollutions produced from zinc-rich coating and the hazards of harmful gas generated during welding.

It should be noted and understood that various modifications and improvements can be done for the above invention described in detail without departing from the spirits and the scopes as claimed in the appended claims. Therefore, the scopes of the technical solutions as claimed are not limited to any specific exemplary teachings.

It should be stated that the invention is illustrated in detail by the above examples but not restricted thereto. That is to say, the implementation of the invention can be independent of the method described above. Those skilled in the art should understand that any improvements for the invention, equivalent replacements of the raw materials, additions of auxiliary ingredients and selections of specific conditions will fall within the protection and disclosure scopes of the invention.

The invention claimed is:

1. An epoxy anti-corrosion coating, comprising:
   a component A curable into a film, and a component B,
   wherein a mass ratio of the component A to the component B is 8:1 to 12:1,
   wherein the component A comprises 0.1-5 wt % of a graphene, 0-35 wt % of a zinc powder, 30-70 wt % of a filler, 10-20 wt % of an epoxy resin having 54 wt % of solid content, and 10-20 wt % of a first solvent, and a sum of the graphene, the zinc powder, and the filler is 60-80 wt %, and
   wherein the component B comprises a curing agent and a second solvent at a mass ratio of 2:3 to 3:2.

2. The epoxy anti-corrosion coating of claim 1, wherein the component A comprises 0.1-5 wt % of the graphene, 0-35 wt % of the zinc powder, 30-70 wt % of the filler, 14-18 wt % of the epoxy resin, and 12-16 wt % of the first solvent, and the sum of the graphene, the zinc powder, and the filler is 66-74 wt %.

3. The epoxy anti-corrosion coating of claim 1, wherein the component A comprises 0.1-5 wt % of the graphene, 0-35 wt % of the zinc powder, 30-70 wt % of the filler, 16 wt % of the epoxy resin, and 14 wt % of the first solvent, and the sum of the graphene, the zinc powder, and the filler is 70 wt %.

4. The epoxy anti-corrosion coating of claim 1, wherein the graphene in the component A is obtained by oxidizing graphite and then exfoliating, and wherein the oxidization method is Hummers method, Staudenmaier method, or Brodie method; and the exfoliation method is microwave exfoliation, pyrolysis expansion exfoliation, or ultrasonic dispersion.

5. The epoxy anti-corrosion coating of claim 1, wherein the first solvent in the component A is selected from the group consisting of benzene hydrocarbons, ketones, alcohols, esters capable of dispersing graphene, and combinations thereof.

6. The epoxy anti-corrosion coating of claim 5, wherein the first solvent in the component A is a mixed solvent of xylene and isobutanol formulated in a mass ratio of 1:1 to 4:1.

7. The epoxy anti-corrosion coating of claim 6, wherein the first solvent in the component A is a mixed solvent of xylene and isobutanol formulated in a mass ratio of 3:1.

8. The epoxy anti-corrosion coating as claimed in claim 1, wherein the filler in the component A is selected from the group consisting of barium sulphate, anti-rust powder, talc, organobentonite, montmorillonite, titanium dioxide, and combinations thereof.

9. The epoxy anti-corrosion coating of claim 8, wherein the filler in the component A is barium sulphate.

10. The epoxy anti-corrosion coating of claim 1, wherein the epoxy resin having 54 wt % solid content in the component A is a solution of bisphenol A epoxy resin having 54 wt % solid content formulated in a solvent of xylene.

11. The epoxy anti-corrosion coating of claim 1, wherein the curing agent in the component B is an acrylic resin curing agent, a polyamide resin curing agent, or a combination thereof; and the second solvent in the component B is a mixed solvent of xylene and isobutanol formulated in a mass ratio of 1:1.

12. The epoxy anti-corrosion coating of claim 11, wherein the curing agent is a polyamide resin curing agent.

13. The epoxy anti-corrosion coating of claim 1, wherein the mass ratio of the component A to the component B is 10:1, and the curing agent and the second solvent in the component B have a mass ratio of 1:1.

14. A preparation method of the epoxy anti-corrosion coating of claim 1, comprising:
   (1) adding the epoxy resin in a formula ratio of the component A into a vessel under stirring at 1000-1500 rpm;
   (2) successively adding into the vessel the first solvent, the zinc powder, the graphene, and the filler under stirring at 2000-3000 rpm to uniformly dispersion;
   (3) grinding the mixture obtained in step (2) to particles of 20-60 µm to obtain the component A;
   (4) mixing the curing agent and the second solvent to obtain the component B; and
   (5) mixing the component A and the component B to obtain the epoxy anti-corrosion coating.

15. The preparation method of the epoxy anti-corrosion coating of claim 14, wherein, in step (1), the stirring is at 1200 rpm, in step (2), the stirring is at 2500 rpm, and in step (3), the particle size of the component A is 40 µm.

* * * * *